(12) United States Patent
Carter et al.

(10) Patent No.: US 9,790,398 B2
(45) Date of Patent: Oct. 17, 2017

(54) SYNTHESIS OF POLYURETHANE POLYMERS VIA COPPER AZIDE-ALKYNE CLICK CHEMISTRY FOR COATINGS, ADHESIVES, SEALANTS AND ELASTOMER APPLICATIONS

(71) Applicant: Sika Technology AG, Baar (CH)

(72) Inventors: Neil Carter, Southport (GB); Ian Martin, Barrow (GB); Alexander Coward, Sale (GB); Mark Gatrell, Chipping Preston (GB); Michael Byrne, Lytham (GB); John E. Cullen, Glasgow (GB); Peter Cormack, Glasgow (GB)

(73) Assignee: SIKA TECHNOLOGY AG, Baar (CH)

( * ) Notice: Subject to any disclaimer, the term of this patent is extended or adjusted under 35 U.S.C. 154(b) by 36 days.

(21) Appl. No.: 14/766,342

(22) PCT Filed: Feb. 5, 2014

(86) PCT No.: PCT/EP2014/052207
§ 371 (c)(1),
(2) Date: Aug. 6, 2015

(87) PCT Pub. No.: WO2014/122153
PCT Pub. Date: Aug. 14, 2014

(65) Prior Publication Data
US 2015/0368530 A1 Dec. 24, 2015

(30) Foreign Application Priority Data
Feb. 8, 2013 (EP) .................................. 13154589

(51) Int. Cl.
| | | |
|---|---|---|
| *C09D 175/04* | (2006.01) | |
| *C09J 175/04* | (2006.01) | |
| *C09D 175/08* | (2006.01) | |
| *C09J 175/08* | (2006.01) | |
| *C09D 163/10* | (2006.01) | |
| *C09J 163/10* | (2006.01) | |
| *C08G 18/76* | (2006.01) | |
| *C08G 18/28* | (2006.01) | |
| *C08G 18/67* | (2006.01) | |
| *E04B 7/00* | (2006.01) | |
| *E04D 7/00* | (2006.01) | |

(52) U.S. Cl.
CPC ....... *C09D 175/04* (2013.01); *C08G 18/2845* (2013.01); *C08G 18/6745* (2013.01); *C08G 18/7671* (2013.01); *C09D 163/10* (2013.01); *C09D 175/08* (2013.01); *C09J 163/10* (2013.01); *C09J 175/04* (2013.01); *C09J 175/08* (2013.01); *E04B 7/00* (2013.01); *E04D 7/00* (2013.01)

(58) Field of Classification Search
CPC ...... C09J 175/08; C09J 175/04; C09J 163/10; C09D 175/08; C09D 175/04; C09D 163/10; C08G 18/6745; C08G 18/7671; C08G 18/2845; E04B 7/00; E04D 7/00
See application file for complete search history.

(56) References Cited

U.S. PATENT DOCUMENTS

| | | | |
|---|---|---|---|
| 8,034,396 B2 * | 10/2011 | Kapiamba | A61L 24/043 427/2.13 |
| 8,101,238 B2 | 1/2012 | Fokin et al. | |
| 2008/0103273 A1 | 5/2008 | Tang et al. | |
| 2008/0311412 A1 | 12/2008 | Fokin et al. | |
| 2010/0234482 A1 * | 9/2010 | Du Prez | C08G 18/3206 521/159 |
| 2011/0112254 A1 * | 5/2011 | Manzara | C08G 18/6229 525/275 |

FOREIGN PATENT DOCUMENTS

| | | |
|---|---|---|
| CN | 101022895 A | 8/2007 |
| CN | 101549169 A | 10/2009 |
| CN | 102597120 A | 7/2012 |

OTHER PUBLICATIONS

Meldal, "Polymer "Clicking" by CuAAC Reactions," Macromolecular Rapid Communications, (Jul. 2008), vol. 29, No. 12-13, pp. 1016-1051.
International Search Report (PCT/ISA/210) dated Mar. 25, 2014, by the European Patent Office as the International Searching Authority for International Application No. PCT/EP2014/052207.
Written Opinion (PCT/ISA/237) dated Mar. 25, 2014, by the European Patent Office as the International Searching Authority for International Application No. PCT/EP2014/052207.
Liu et al., "Efficient Synthesis of Linear Multifunctional Poly(ethylene glycol) by Copper(I)-Catalyzed Huisgen 1,3-Dipolar Cycloaddition", Biomacromolecule, Sep. 2007, pp. 2653-2658, vol. 8, No. 9.
Ossipov et al., "Poly(vinyl alcohol)-based hydrogels formed by click chemistry", Macromolecules. American Chemical Society, Mar. 2006, pp. 1709-1718, vol. 39, No. 5.

(Continued)

*Primary Examiner* — Rabon Sergent
(74) *Attorney, Agent, or Firm* — Buchanan Ingersoll & Rooney PC

(57) ABSTRACT

The present application is directed at the reaction product of an azide compound having two or more azide groups attached thereto and an alkyne compound having two or more alkyne groups attached thereto, wherein the azide and alkyne groups react in a 1,3-dipolar cyclo addition to form 1,4-disubstituted triazols and wherein the azide or alkyne compound or both include —O—(C=O)—NR— functional groups. The reaction products can be used as coatings, such as for flat roofs, sealants, adhesives and in elastomer applications. Methods for producing the reaction products as well as substrates including a coating of the reaction product are also disclosed.

15 Claims, No Drawings

(56) References Cited

OTHER PUBLICATIONS

Kolb et al., "Click Chemistry: Diverse Chemical Function from a Few Good Reactions", Angew. Chem. Int. Ed., 2001 (month unknown), pp. 2004-2021.

Apr. 6, 2017 Chinese Office Action issued by SIPO in Chinese Application No. 201480007304.9 (with English language translation).

* cited by examiner

SYNTHESIS OF POLYURETHANE POLYMERS VIA COPPER AZIDE-ALKYNE CLICK CHEMISTRY FOR COATINGS, ADHESIVES, SEALANTS AND ELASTOMER APPLICATIONS

The present application is directed at reaction products of an azide compound having two or more azide groups attached thereto and an alkyne compound having two or more alkyne groups attached thereto, wherein the azide and alkyne groups react in a 1,3-dipolar cycloaddition to form 1,4-disubstituted triazols and wherein the azide or alkyne compound or both comprise —O(C=O)—NR— functional groups with R=hydrogen or alkyl. The corresponding reaction products are suitable for use as coatings, sealants, adhesives and in elastomer applications. The present application is also directed at a method for preparing such reaction products as well as substrates comprising coatings of said reaction products.

STATE OF THE ART

Curable compositions based on isocyanate functional polyurethane polymers are widely used in the field of adhesives, sealants, coatings, casting resins and the like. However toxicity considerations have amongst other reasons led to the development of new curable materials based on different chemical mechanisms. Although compositions based on alternative curing or chemical cross-linking technologies have gained in importance over the past years, there is still a demand for novel curing systems, particularly related to specific fields of use.

One example for such a particular use is the relatively recent technology of liquid applied membranes (LAM's) as increasingly used in waterproofing and roofing applications.

Conventional roofing systems for instance are based on asphalt or felt. These materials require elevated temperature during their application and fastening to the roof structure, which may act as a source of fire and thus involves a significant risk.

In recent years liquid polyurethane prepolymers, have been described as a substitute for these conventional roofing systems. These materials cure at ambient temperatures in a range of environmental conditions and thus represent a robust alternative for the coating of flat roofs. Due to the high reactivity of the isocyanate groups, these materials cure quickly and efficiently in the presence of atmospheric moisture to provide an impervious water barrier.

The current technology involves isocyanate-terminated polyurethane prepolymers, which form the basis of liquid applied membranes (LAM's). The polyurethane prepolymers can be applied to both sides of a polyester/glass fiber mesh by spray or roller coating, so that the polyester/glass fiber mesh is sandwiched between two coatings. The spray roller application is a particularly simple method, while the polyester provides strength and impact resistance to the product.

As mentioned above, polyurethane liquid-applied membranes (LAM's) cure at ambient temperature. This is a significant advantage over conventional flat roofing materials, which require elevated temperatures for their application resulting in a higher risk of accidents. LAM materials avoid this risk. In addition the materials can be applied seamless and exhibit elastomeric and excellent waterproofing properties. This makes them ideally suited for flat roofing applications.

As it is the case for curable compositions based on isocyanate functional polyurethane polymers in general, the presence of residual monomeric isocyanate is also a drawback of polyurethane LAM's. Since isocyanates are associated with toxicity issues, special care has to be taken when the materials are handled resulting in additional costs. There is hence a need for alternative materials usable in adhesives, sealants, coatings, liquid applied membranes, casting resins and the like, which provide about the same properties as polyurethane compositions, but which do not involve monomeric isocyanates during their use or application.

Click chemistry was a term coined by Sharpless et al. in 2001. This type of chemistry aimed to mimic nature by joining small molecules together with heteroatom links and defined a number of criteria that a reaction must satisfy to be classed as click type reaction. These criteria are that the reaction must be modular, have a wide scope, provide high yields and produce inoffensive by-products (which can be removed by non-chromatographic methods). In addition the reaction must be stereospecific and must involve simple reaction conditions (insensitive to water and oxygen) and product isolation. Finally the reaction should use readily available starting materials, reactants and solvents which are easily removed.

An example of a click reaction which has attracted wide attention in the last years is the copper catalyzed azide-alkyne cycloaddition (CuAAC). The azide-alkyne cycloaddition was first described by Huisgen in 1963 and was carried out in the absence of a catalyst requiring elevated temperatures and giving a mixture of products (namely the 1,4 and 1,5-substituted triazols). The $Cu^I$ catalyzed cycloaddition was discovered independently by Meldal (Macromol. Rapid. Com. 2008, 29 (1312-13), 1016-1051) and Sharpless (Angew. Chem. Int. Edit. 2001, 40 (11), 2004). The benefit of the copper catalyzed system was that the reactions could be performed at room temperature and resulted in the exclusive formation of 1,4-substituted triazol products. A specific advantage of this type of chemistry is that the azide and alkyne moieties are generally unreactive towards a wide range of functional groups. This eliminates the need for extensive protecting group chemistry and was the key to the reaction's popularity in a number of scientific fields such as the biomedical field and material science.

While the initial investigations of 1,3-dipolar cycloadditions via click chemistry were focused on the functionalization and attachment of small molecules to in particular biochemical molecules, a recent development described in U.S. Pat. No. 8,101,238 B2 is directed at adhesive polymers which are formed from polyvalent alkynes and azides and which can be assembled into cross-linked polymer networks by copper catalysis. The patent in particular describes the formation of coatings on copper metal surfaces which act as a catalyst for the alkynes and azides to form linear polymers including up to 22 units of a diazide and dialkyne or cross-linked polymeric networks. The materials disclosed in the patent were suggested for applications such as adhesives and coatings and for combination with cement and other materials.

Polymeric triazols constructed by 1,3-dipolar cycloaddition have also been described in US 2008/103273 A1. In this case the materials were prepared by thermal conversion at about 100° C. without the addition of a catalyst which resulted in the formation of both 1,4- and 1,5-disubstituted triazols. The materials prepared in US 2008/103273 A1 are described as "hyper-branched", which is a result of the exclusive use of tri- or higher substituted alkynes and azides in their preparation. The advantage of these materials is that their preparation does not involve the use of additional solvents or catalysts, which might have detrimental effects on the resulting properties. As a downside however this benefit is compensated by the necessity to cure them at elevated temperatures.

Xin-Ming, L. et al. describe the synthesis of linear polyethylenglycols using 1,3-dipolar cycloaddition for chain extension in *Biomacromolecules* 2007, 8, p. 2653-2658. In particular, it is described that a polyethylenglycols having pendant alkine moieties are reacted with 2,2-bis(azidomethyl)propane-1,3,diol and coppersulfate/sodiumascorbate.

A significant disadvantage of the above described systems is that they require the use di- and polyazides, which have relatively high nitrogen contents. For examples U.S. Pat. No. 8,101,238 describes compounds having nitrogen contents of up to about 60% in the form of azides, which is impracticable for industrial application due to the compounds' explosiveness. The compounds of US 2008/103273 A1 and Xin-Ming, L. et al. have nitrogen contents in the form of azides of about 23% and 43%, respectively, which pose a problem when the azide compounds are handled as such.

Ossipov et al. in *Macromolecules* 2006, 39, p. 1709-1718 describe the preparation of poly(vinyl alcohol)-based hydrogels via 1,3-dipolar cycloaddition, wherein the polyvinylalcohol is first functionalized with either azide or alkine functionalities and subsequently the two polyvinylalcohols are reacted with each other by cyclisation of the alkine and azide groups. Ossipov also describes that azide terminated polyethylenglycols may be used as a replacement for the azide modified polyvinylalcohol.

Despite of the above described advancements in technology, the 1,3-dipolar cycloaddition of multivalent azides and alkynes has not been described in combination with prepolymer precursors to which the azide and alkyne groups have been attached. Such prepolymers would have the advantage that the azide content of a prepolymer relative to its total weigh could be low enough to minimize the risk of explosions, while the number of azides in the prepolymer molecules can be higher than two allowing the formation of cross-linked systems.

Moreover, the materials described in the two afore-mentioned patent documents are not suitable for applications in areas of use requiring high elastomeric properties and toughness, as obtained e.g. with conventional polyurethane materials. One example of such a technical area is the one of roofing systems based on LAM-materials. Thus, there remains a need for alternative materials, which can be cross-linked and hardened in the absence of isocyanates, preferably by using a 1,3-dipolar cycloaddition of azides and alkynes, and which provide the same or comparable product characteristics as the conventional polyurethane materials. Furthermore it is a particular objective of the present invention to provide such alternative materials suitable as liquid applied membranes, particularly for roofing applications.

The present application addresses these needs.

DESCRIPTION OF THE INVENTION

It has unexpectedly been discovered that the above-mentioned desired properties are provided by the reaction product of an azide compound having two or more azide groups attached thereto and an alkyne compound having two or more alkyne groups attached thereto, wherein the azide and alkyne groups react in a 1,3-dipolar cyclo addition to form 1,4-disubstituted triazols and wherein the azide or alkyne compound both comprise —O—(C=O)—NR— functional groups with R=hydrogen or alkyl. The above implies, that either the azide compound or the alkyne compound or both of the above-mentioned reaction products are themselves the reaction product of an azide/alkyne precursor and a polyisocyanate or isocyanate-terminated polyurethane prepolymer.

For the inventive reaction product it is preferred, that it contains substantially only 1,4-disubstituted triazols (i.e. less than 2%, preferably less than 1% of the triazoles should have 1,5-disubstitution).

The alkyl in the aforementioned R is preferably a straight chain or branched C1-C6 alkyl group, more preferably a straight chain alkyl group and even more preferably a straight chain C1-C4 alkyl group. Most preferably, however R in the —O—(C=O)—NR— functional groups is hydrogen.

In the practice of the present application, the azide compound and/or the alkyne compound may comprise a prepolymer having the respective functional groups attached thereto. The number average molecular weight of both of these prepolymers is preferable 15.000 g/mol or less, more preferably 10.000 g/mol or less, even more preferably 8.000 g/mol or less and most preferably 5.000 g/mol or less. Independently therefrom, the number average molecular weight of the prepolymers is preferably 150 g/mol or more, more preferably 200 g/mol or more, and most preferably 250 g/mol or more. These weights are determined by GPC.

If both, the azide compound and the alkyne compounds are prepolymers, at least one of these prepolymers is a polyurethane prepolymer. Moreover, it is preferred, that the alkyne and/or azide moieties, in particular both alkyne and azide moieties, are attached at the ends of the prepolymer, as opposed to an attachment of these groups on the backbone of the prepolymer. Thus, a linear prepolymer preferably has two alkyne or azide moieties attached to its ends, while a branched prepolymer has alkyne and/or azide moieties attached to its ends in accordance with its number of branches.

A "polyurethane prepolymer", as this term is used in the present application comprises at least two urethane groups in each molecule. In a further embodiment of the present application, both, the azide and alkyne compound, are polyurethane prepolymers.

In the above, it was mentioned that the azide or alkyne compound should have two or more azide or alkyne groups respectively attached thereto. This means that each molecule in the azide or alkyne compound respectively should have two or more azide/alkyne groups attached thereto. Still, the molecule does not have to be a unitary molecule for the whole azide or alkyne compound. The molecule may be represented by a single type of molecule such as e.g. a specific polyazide or polyalkyne but may also be represented by mixtures of different polyazides or polyalkynes, or by prepolymers which have a distribution of different chain lengths and/or repeating units.

In the azide compound of the present application, the nitrogen content derivable from azide relative to the total weight of the molecule is preferably 20 wt.-% or less, more preferably 18 wt.-% or less, even more preferably 16 wt.-% or less and most preferably 15 wt.-% or less. Such low azide contents ensure that the compounds are sufficiently stable against explosive decomposition, so that extensive precautions for their handling can be avoided. On the other hand, it is preferred that the nitrogen content derivable from azide relative to the total weight of the molecule in the azide compound is 1 wt.-% or more, more preferably 2 wt.-% or more, even more preferably 5 wt.-% or more and most preferably 8 wt.-% or more. This azide content ensures that the respective compounds have a sufficiently low viscosity during handling, while at the same time the molecules of the azide compound comprise multiple azide groups.

In the present application, substance names starting with "poly", such as, for example, polyazide, polyalkyne, polyisocyanate, polyurethane, polyester or polyol, designate substances which formally contain, per molecule, two or more of the functional groups occurring in their name.

In the present document, the term "polymer" encompasses first the group of chemically uniform macromolecules which however differ with respect to the degree of polymerization, molar mass and chain length, which group was prepared by a polyreaction (polymerization, polyaddition, polycondensation). Secondly, the term also encompasses derivatives of such a group of macromolecules for polyreactions, i.e., compounds which have been obtained by reactions, such as, for example, additions or substitutions of functional groups on specified macromolecules and which may be chemically uniform or chemically non-uniform. Furthermore, the term also encompasses so-called prepolymers, i.e. reactive polymeric molecules which are involved in the synthesis of macromolecules.

In the present application, the term "polymeric polyol" encompasses any desired polymer according to the above definition which has more than one hydroxyl group. Accordingly, the term "polymeric diol" encompasses any desired polymer which has exactly two hydroxyl groups.

The term "polyurethane polymer" encompasses all polymers which are prepared by the so-called diisocyanate polyaddition process. This also includes those polymers which are virtually or completely free of urethane groups, such as polyureas. Examples of polyurethane polymers are polyether polyurethanes, polyester polyurethanes, polyether polyureas, polyureas, polyester polyureas, polyisocyanates and polycarbodiimides. Preferably, however, the polymers contain urethane groups.

In the present document, "molecular weight" is understood as meaning the number average molecular weight as measured by GPC.

The azide compound mentioned above can advantageously be prepared from epoxide precursors which allow the preparation of azide compounds having a hydroxyl group on the β-carbon of the azide group. The epoxide precursor is simply heated with a nucleophilic azide, in particular an inorganic azide such as for example sodium or potassium azide, at elevated temperatures to effect ring-opening of the epoxy group and attachment of the azide group to the α-carbon.

In a preferred embodiment, the azide compound is obtainable by the reaction of a polyisocyanate or isocyanate-terminated polyurethane prepolymer and an epoxy compound having functional groups reactive towards isocyanates. Preferred functional groups in this context are hydroxyl groups. The epoxy functionalized polyisocyanate or isocyanate-terminated polyurethane prepolymer obtained thereby is subsequently reacted with a nucleophilic azide, preferably with an inorganic azide such as sodium azide, to effect ring opening of the epoxy groups and attachment of the azide groups to the epoxy functionalized polyisocyanate or isocyanate-terminated polyurethane prepolymer.

Epoxy compounds having functional groups reactive towards isocyanates include in particular epoxy functionalized alcohols, such as glycidol or monoadducts of diepoxides, such as Bisphenol A or F diglycidyl ethers, with alcohols, such as methanol or butanol. A particularly preferred epoxy compound is glycidol.

As concerns the polyisocyanate, the present application is not subject to any relevant restrictions. Suitable isocyanates for use in the present application are for example diisocyanates such as for example 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis (isocyanatomethyl)cyclohexane), m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-toluene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NID), 3,3'-dimethyl-4,4'-diisocyanatobiphenyl (TOBI); oligomers and polymers of the abovementioned isocyanates, and any desired mixtures of the abovementioned isocyanates. Preferred diisocyanates in the present application are 2,4- and 2,6-toluene diisocyanate (TDI) and any mixture of these isomers, as well as 4,4'-, 2,4' and 2,2'-diphenylmethandiisocyanate (MDI) and any mixture of these isomers. The isocyanate-terminated polyurethane prepolymers are suitably based on the above-mentioned isocyanates.

In the practice of the present application it is particularly preferred that the polyisocyanate is MDI or a prepolymer containing terminal MDI residues.

To provide an isocyanate-terminated polyurethane prepolymer, the polyisocyanates may suitably be reacted with polyols including polyoxyalkylenepolyethylenepolyols, also referred to as polyether polyols, polyester polyols, polycarbonate polyols and mixtures thereof. The most preferred polyols are diols, in particular polyoxyethylene diols, polyoxypropylene diols or polyoxybutylene diols.

Particularly suitable polyetherpolyols, also referred to as polyoxyalkylenepolyols or oligoetherols, are those which are polymerization products of ethylene oxide, 1,2-propylene oxide, 1,2- or 2,3-butylene oxide, oxethane, tetrahydrofurane or mixtures thereof, optionally polymerized with the aid of an initiator having two or more active hydrogen atoms per molecule, such as, for example, water, ammonia or compounds having a plurality of OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of said compounds. Both polyoxyalkylenepolyols which have a low degree of unsaturation (measured according to ASTM D-2849-69 and stated in milliequivalent unsaturation per gram of polyol (meq/g)), prepared, for example, with the aid of so-called double metal cyanide complex catalysts (DMC catalysts), and polyoxyalkylenepolyols having a higher degree of unsaturation, prepared, for example, with the aid of anionic catalysts, such as NaOH, KOH, CsOH or alkali metal alcoholates, may be used. Polyoxyethylenepolyols and polyoxypropylenepolyols, in particular polyoxyethylenediols, polyoxypropylenediols, polyoxyethylenetriols and polyoxypropylenetriols, are particularly suitable.

Polyoxyalkylenediols or polyoxyalkylenetriols having a degree of unsaturation of less than 0.02 meq/g and having a molecular weight in the range from 1000 to 30000 g/mol and polyoxyethylenediols, polyoxyethylenetriols, polyoxypropylenediols and polyoxypropylenetriols having a molecular weight of from 400 to 8000 g/mol, preferably 2500 to 5000 g/mol, are particularly suitable.

Also particularly suitable are so-called ethylene oxide-terminated ("EO-endcapped", ethylene oxide-endcapped) polyoxypropylenepolyols. The latter are special polyoxypropylenepolyoxyethylenepolyols which are obtained, for example, by further alkoxylating pure polyoxypropylenepolyols, in particular polyoxypropylenediols and -triols, with ethylene oxide after the end of the polypropoxylation reaction and have primary hydroxyl groups as a result. In this case, polyoxypropylenepolyoxyethylenediols and polyoxypropylenepolyoxy-ethylenetriols are preferred.

Styrene-acrylonitrile-grafted polyetherpolyols, as are commercially available, for example, under the tradename Lupranol® from Elastogran GmbH, Germany, are furthermore suitable.

In particular, polyesters which carry at least two hydroxyl groups and are prepared by known processes, in particular the polycondensation of hydroxycarboxylic acids or the polycondensation of aliphatic and/or aromatic polycarboxylic acids with dihydric or polyhydric alcohols, are suitable as polyesterpolyols.

Polyesterpolyols which are prepared from dihydric to trihydric alcohols, such as, for example, 1,2-ethanediol, diethylene glycol, 1,2-propanediol, dipropylene glycol, 1,4-butanediol, 1,5-pentanediol, 1,6-hexanediol, neopentyl-glycol, glycerol, 1,1,1-trimethylolpropane or mixtures of the above-mentioned alcohols, with organic dicarboxylic acids or anhydrides or esters thereof, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the above-mentioned acids, and polyesterpolyols obtained from lactones, such as, for example, ε-caprolactone, are particularly suitable.

Polyesterdiols, in particular those which are prepared from adipic acid, azelaic acid, sebacic acid, dodecanedicarboxylic acid, dimer fatty acid, phthalic acid, isophthalic acid and terephthalic acid as the dicarboxylic acid or from lactones, such as, for example, ε-caprolactone, and from ethylene glycol, diethylene glycol, neopentylglycol, 1,4-butanediol, 1,6-hexanediol, dimer fatty acid diol and 1,4-cyclohexanedimethanol as the dihydric alcohol, are particularly suitable.

Particularly suitable polycarbonate polyols are those as are obtainable by reacting, for example, the above-mentioned alcohols used for the synthesis of the polyesterpolyols with dialkyl carbonates, such as dimethyl carbonate, diaryl carbonates, such as diphenyl carbonate, or phosgene. Polycarbonatediols, in particular amorphous polycarbonatediols, are particularly suitable.

Further suitable polyols are poly(meth)acrylate polyols.

Polyhydroxy-functional fats and oils, for example natural fats and oils, in particular castor oil, or polyols obtained by chemical modification of natural fats and oils, so-called oleochemical polyols, the epoxypolyesters or epoxypolyethers obtained, for example, by epoxidation of unsaturated oils and subsequent ring opening with carboxylic acids or alcohols, or polyols obtained by hydroformylation and hydrogenation of unsaturated oils are furthermore suitable. These are furthermore polyols which are obtained from natural fats and oils by degradation processes, such as alcoholysis or ozonolysis, and subsequent chemical linkage, for example by transesterification or dimerization, of the degradation products thus obtained or derivatives thereof. Suitable degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters.

Furthermore, polyhydrocarbon-polyols, also referred to as oligohydro-carbonols, for example polyhydroxy-functional ethylene-propylene, ethylene-butylene or ethylene-propylene-diene copolymers, as produced, for example, by Kraton Polymers, USA, or polyhydroxy-functional copolymers obtained from dienes, such as 1,3-butadiene or diene mixtures, and vinyl monomers, such as styrene, acrylonitrile or isobutylene, or polyhydroxy-functional polybutadiene polyols, for example those which can be prepared by copolymerization of 1,3-butadiene and allyl alcohol or by oxidation of polybutadiene and can also be hydrogenated, are likewise suitable.

Polyhydroxy-functional acrylonitrile/butadiene copolymers, as can be prepared, for example, from epoxides or amino alcohols and carboxyl-terminated acrylonitrile/butadiene copolymers (commercially available under the name Hypro® CTBN from Emerald Performance Materials, LLC, USA), are furthermore suitable.

Said polyols preferably have an average molecular weight of from 250 to 30000 g/mol, in particular from 1000 to 30000 g/mol, and an average OH functionality in the range from 1.6 to 3.

Particularly suitable polyols are polyesterpolyols and polyetherpolyols, in particular polyoxyethylenepolyol, polyoxypropylenepolyol and polyoxy-propylenepolyoxyethylenepolyol, preferably polyoxyethylenediol, polyoxy-propylenediol, polyoxyethylenetriol, polyoxypropylenetriol, polyoxypropylene-polyoxyethylenediol and polyoxypropylenepolyoxyethylenetriol.

In addition to said polyols, small amounts of low molecular weight di- or polyhydric alcohols, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the above-mentioned di- and polyhydric alcohols, and mixtures of the above-mentioned alcohols can be concomitantly used in the preparation of the polyurethane prepolymer having isocyanate groups.

In an alternative embodiment, the azide compound is obtainable by the reaction of a polyol with an epoxy compound having a functional group reactive towards hydroxyl groups and subsequent reaction with a nucleophilic azide. Functional groups reactive towards hydroxyl groups are for example halogens such as in particular chlorine, bromine or iodine and sulphates but also conventional leaving groups including toluenesulfonate, trifluor acetate, trifluor sulphate, etc. A preferred epoxy compound having a functional group reactive towards alcohols is epichlorhydrine.

As a polyol, the above-mentioned polyols can be used.

In a further embodiment of the present application, the azide compound is obtainable by the reaction of a nucleophilic azide, preferably an inorganic azide, with an epoxy compound and subsequent reaction with a polyisocyanate. As explained above, the reaction of an azide with a monoepoxy compound leads to ring opening of the epoxy resulting in the formation of a hydroxyl group and, adjacent thereto, an azide group.

Epoxy compounds which can advantageously be used for azide opening, are in particular linear for branched C1-C18 alkyl glycidyl ethers (for example C12/C14 alkyl glycidyl ether, C13/C15 alkyl glycidyl ether, 2-ethylhexylglycidylether), p-tertbutylphenylmonoglycidylether, O-cresylglycidylether, glycidylether of cashew nut shell oil, glycidyl ether of C1-C18 carboxylic acid or allylglycidylether. A preferred monoepoxy compound for this embodiment is allylglycidylether.

The alkyne compound mentioned in the above can advantageously be prepared by the reaction of an epoxy compound and an alkyne having functional groups reactive towards epoxies. The resulting product may subsequently be reacted with an alkyne group-containing alkylation agent to obtain an alkyne compound having two or more alkyne groups. Preferably, the functional group reactive toward epoxies is an amine or a thiol group, but hydroxyl or carboxyl groups may also be employed as functional groups.

It is further preferred, that the alkyne-containing alkylation agent is a propargyl halogenide, preferably propagyl chloride or bromide as these compounds are commercially available and cheap.

In a further embodiment of the present application, the alkyne compound is obtainable by the reaction of a polyisocyanate or isocyanate terminated polyurethane prepolymer and an alkyne having a functional group reactive towards isocyanates. The functional group reactive towards isocyanates is preferably an amine, hydroxyl or thiol group. The alkyne may be straight chain or branched and comprise cyclic moieties. The alkyne preferably comprises 3 to 10 carbon atoms, and more preferably 3 to 8 carbon atoms. The most preferred alkyne for the reaction with polyisocyanates or polyisocyanate prepolymer is propargyl alcohol.

The reaction product of the present application is obtainable by reacting an azide compound having two or more azide groups attached thereto and an alkyne compound having two or more alkyne groups attached thereto in a 1,3-dipolar cycloaddition of the azide and alkyne groups. This can for example be achieved by simply heating the components to temperatures sufficient to affect the cycloaddition such as in particular at least 100° C., preferably at least 120° C. and more preferably at least 140° C.

In the practice of the present application, it is preferred however, that the azide/alkyne reaction is catalyzed as this allows a significant reduction of the reaction temperature to about ambient temperature (20° C.).

The catalyst in the present application is preferably a $Cu^I$-based catalyst. The $Cu^I$-based catalyst may e.g. be represented by a copper or copper-containing surface, which contains sufficient $Cu^I$ in the surface layer to provide the required catalytic action. If the application of the inventive reaction product to non copper-containing surfaces is intended, it is necessary however that the $Cu^I$-based catalyst comprises a copper source which is not attached to the surface of a material to which the reaction product is to be applied.

Suitable copper catalysts of this type can be based on commercially available $Cu^I$ salts such as CuBr or CuI. It has been observed however, that $Cu^I$ precursors do not provide catalysts with high reactivities in the formation of 1,3-disubstituted triazols when azide compounds having two or more azide groups attached thereto and alkyne compounds having two or more alkyne groups attached to a molecule are reacted. It has been observed however, that $Cu^{II}$ precursors which are converted to $Cu^I$ by the action of a reducing agent, provide enhanced activity. A suitable $Cu^{II}$ precursor is copper sulphate or $copper^{II}$ acetate monohydrate. Suitable reducing agents include for example triphenyl phosphine, sodium ascorbate and hydroquinone.

In the investigations leading to the present application, it has been observed that a catalyst which is prepared in situ from $Cu^{II}$ acetate and triphenylphosphine provided the best conversions of azide and alkyne compounds, so that this catalyst is preferred for the preparation of the inventive reaction products.

In addition to the catalyst, a complexing agent for copper can be used which stabilizes the $Cu^I$ and preferably also improves the reactivity of the catalyst. A preferred complexing agent for use in combination with the catalyst is tris-(benzyltriazolylmethyl)amine (TBTA).

A further aspect of the present application is the use of a reaction product as described above as a coating, preferably as a coating for flat roofs. An alternative aspect of the present application is the use of the reaction product as defined above as a sealant, adhesive or in elastomer applications. Preferred embodiments for this use are the same as described above for the reaction product itself.

A yet further aspect of the present application is a method for preparing a reaction product as described above, comprising reacting an azide compound having two or more azide groups attached thereto and an alkyne compound having two or more alkyne groups attached thereto in the optional presence of a catalyst and a solvent. Suitable solvents in the context of the present application include in particular solvents compatible with polyurethane chemistry, such as DMF, DMSO, methoxy propyl acetate (MPA) and N-methylpyrrolidone (NMP), or mixtures thereof. More preferably, the solvent is selected from DMF and methoxy propyl acetate as these can readily be dried.

This avoids the problem of residual moisture which in isocyanate-based systems leads to reactions of the isocyanates and resulting by-products during the preparation of the azide or alkyne compound.

A further aspect of the present application is a substrate comprising a coating of the reaction product as described above. The preferred embodiments described for the inventive reaction product likewise apply to the herein described coating. In a particularly preferred embodiment the substrate is part of a roof structure.

In the following, the present application will be described by way of examples, which however, are not intended to limit the present application by any means.

Example 1

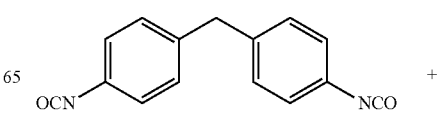

-continued

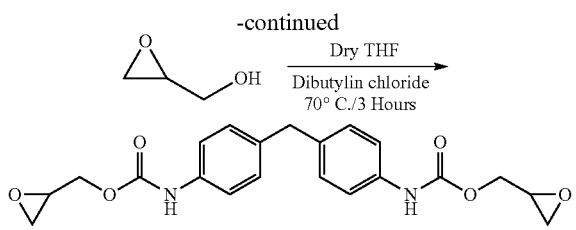

To a reaction vial containing a magnetic stirrer MDI (1 g, 4 mmol) was added along with glycidol (557 μL; 2.1 eq. 8.4 mmol) and dibutyltin dilaurate (236 μL; 0.1 eq. 0.4 mmol) then 5 ml of dry THF was added to the reaction vessel. The reaction vessel was initially heated to 70° C. for 6 hours, and then cooled to room temperature.

The resulting organic product was worked-up into ethyl acetate and washed with distilled water (10 ml×3) and the combined aqueous layers were washed with ethyl acetate (10 ml×2). The organic layers were combined and dried over sodium sulphate and subsequently filtered. The organic solvent was then removed under reduced pressure to afford the desired product as a white solid.

Yield: 75%

$^1$H NMR (400 MHz, DMSO-d$_6$) δ ppm 2.67 (dd, J=4.5, 2.5 Hz, 2H) 2.81 (t, J=4.5 Hz, 2H) 3.24 (d, J=2.5 Hz, 2H) 3.81 (s, 2H) 3.85 (dd, J=12, 6.78 Hz, 2H) 4.44 (dd, J=12, 2.5 Hz, 2H) 7.11 (d, J=8.5 Hz, 4H) 7.37 (d, 7=8.0 Hz, 4H) 9.69 (br. s., 2H)

$^{13}$C NMR (101 MHz, DMSO-d$_6$) δ ppm 39.53 (C9) 43.81 (C1) 49.27 (C2) 65.06 (C3) 118.43 (C6) 128.87 (C8) 135.61 (C7) 136.87 (C5) 153.14 (C4)

Example 2

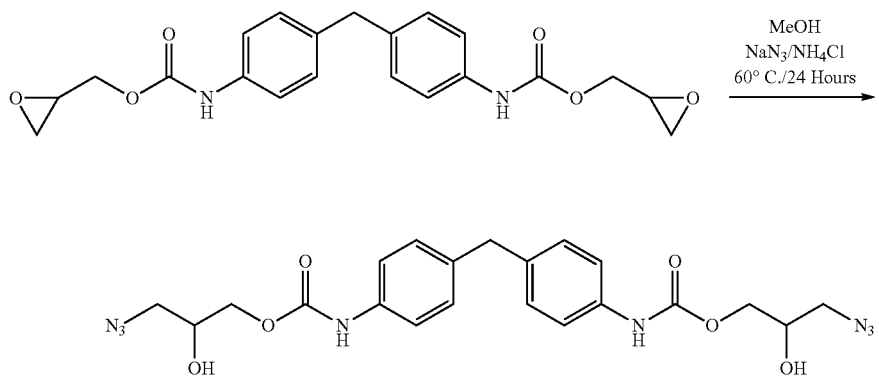

To a reaction vial containing a magnetic stirrer the product of Example 1 (0.1 g, 0.25 mmol) was added along with sodium azide (97.9 mg, 6 eq. 1.5 mmol) and ammonium chloride (80.6 mg, 6 eq. 1.5 mmol) then 10 ml of methanol was added to the reaction vessel. The reaction vessel was initially heated to 60° C. for 24 hours, and then cooled to room temperature.

The resulting organic product was worked-up into ethyl acetate and washed with distilled water (10 ml×3) and the combined aqueous layers were washed with ethyl acetate (10 ml×2). The organic layers were combined and dried over sodium sulphate and subsequently filtered. The organic solvent was then removed under reduced pressure to afford the desired product as a white solid.

Yield: 55%

$^1$H NMR (400 MHz, Acetone-d$_6$) δ ppm 3.31-3.47 (m, 4H) 3.90 (s, 2H) 4.03-4.24 (m, 6H) 4.58 (d, J=4.52 Hz, 2H) 7.17 (d, J=8.03 Hz, 4H) 7.48 (d, J=8.03 Hz, 4H) 8.60 (br. s., 2H)

$^{13}$C NMR (101 MHz, Acetone-d$_6$) δ ppm 39.69 (C9) 53.04 (C1) 65.18 (C3) 68.31 (C2) 117.91 (C6) 128.57 (C8) 135.51 (C7) 136.56 (C5) 152.85 (C4)

Example 3

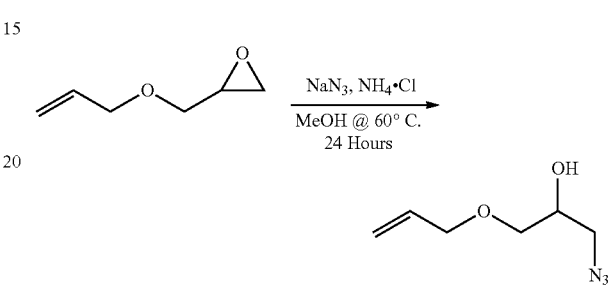

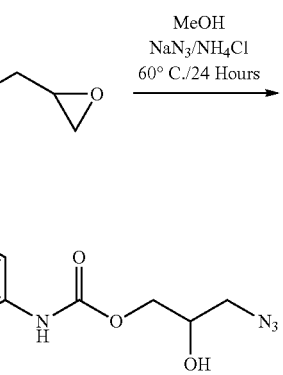

To a reaction vial containing a magnetic stirrer allyl glycidyl ether (2 g, 17.5 mmol) was added along with sodium azide (3.42 g, 3 eq. 52.6 mmol) and ammonium chloride (2.81 g, 3 eq. 52.6 mmol) then 20 ml of methanol was added to the reaction vessel. The reaction vessel was initially heated to 60° C. for 24 hours, and then cooled to room temperature.

The resulting organic product was worked-up into ethyl acetate and washed with distilled water (15 ml×3) and the combined aqueous layers were washed with ethyl acetate (15 ml×2). The organic layers were combined and dried over sodium sulphate and subsequently filtered. The organic solvent was then removed under reduced pressure to afford the desired product as a slightly viscous yellow liquid.

Yield: 69%

$^1$H NMR (400 MHz, chloroform-d) δ ppm 3.02 (br. s., 1H) 3.29-3.40 (m, 2H) 3.41-3.50 (m, 2H) 3.92 (dt, J=10.29, 5.4 Hz, 1H) 4.00 (d, J=5.5 Hz, 2H) 5.13-5.31 (m, 2H) 5.88 (ddt, J=16.8, 10.9, 5.6, 5.6 Hz, 1H)

$^{13}$C NMR (101 MHz, chloroform-d) δ ppm 53.05 (C6) 69.11 (C5) 70.82 (C3) 71.86 (C4) 117.07 (C1) 133.69 (C2)

Example 4

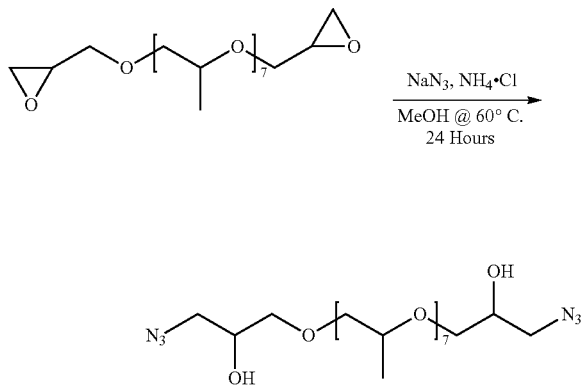

To a round-bottomed flask, fitted with condenser and magnetic stirrer was added Grilonit® F704 (from EMS-Griltech) (10 mL, 19.8 mmol) along with sodium azide (7.71 g, 6 eq. 118 mmol) and ammonium chloride (6.3 g, 6 eq. 118 mmol) then 50 ml of methanol was added to the reaction vessel. The reaction vessel was heated to 60° C. for 24 hours on an oil bath, and then cooled to room temperature.

The resulting organic product was worked-up into ethyl acetate and washed with distilled water (30 ml×3) and the combined aqueous layers were washed with ethyl acetate (30 ml×2). The organic layers were combined and dried over sodium sulphate and subsequently filtered. The organic solvent was then removed under reduced pressure to afford a slightly viscous yellow liquid.

Yield: 70%

The successful insertion of azide into Grilonit® F704 was confirmed by FT-IR and mass spectrometry.

MALDI MS expected 622. found (M+Na)$^+$645

Example 5

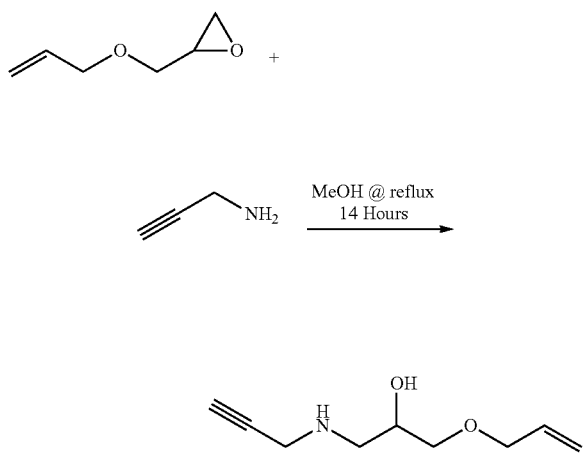

To a reaction vial containing a magnetic stirrer allyl glycidyl ether(AGE) (103 µL, 0.88 mmol) was added along with propargyl amine (168 µL, 3 eq. 2.63 mmol) and 20 ml of methanol was added to the reaction vessel. The reaction vessel was initially heated to reflux for 14 hours, and then cooled to room temperature.

The resulting crude organic product was worked-up into ethyl acetate and washed with distilled water (15 ml×3) and the combined aqueous layers were washed with ethyl acetate (15 ml×2). The organic layers were combined and dried over sodium sulphate and subsequently filtered. The organic solvent was then removed under reduced pressure to afford the desired product as a slightly viscous yellow liquid.

Example 6

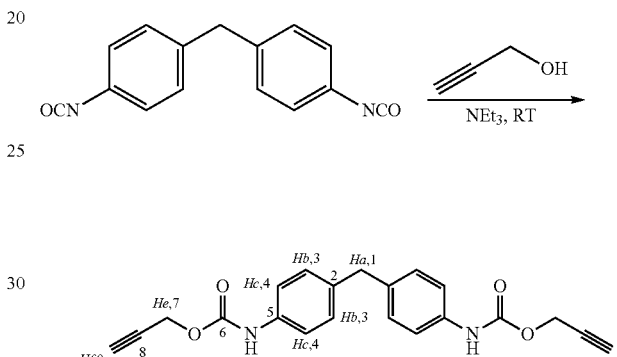

To a round-bottomed flask containing a magnetic stirrer MDI (10 g, 40 mmol) was added along with propargyl alcohol (5.1 mL; 2.2 eq. 88 mmol) and triethylamine (5.6 mL, 40 mmol) then 25 ml of dry THF was added to the reaction vessel. The reaction vessels were initially immersed in an ice bath, which was subsequently removed.

The reaction was stirred for 24 hours and then quenched with 2M HCl (30 ml) the aqueous layer was washed with ethyl acetate (20 ml×3) the combined organic layers were dried over sodium sulphate and subsequently filtered. The solvent was then removed under reduced pressure to afford an off-white solid.

Yield: 73%

Appearance: Off-white solid.

Melting point: 162-164° C.

FT-IR v/cm$^{-1}$: (KBr) 3326, 3292 (alkyne C—H stretch), 3131, 2919, 2115 (alkyne C—C stretch), 1723 (urethane C=O stretch), 1544, 1432.

$^1$H NMR (500 MHz, DMSO-d$_6$) δ ppm 3.53 (t, J=2.50 Hz, 2H) 3.80 (s, 2H) 4.73 (d, J=2.51 Hz, 4H) 7.11 (d, J=8.5 Hz, 4H) 7.34 (d, J=8.2 Hz, 4H) 9.73 (br. s., 2H)

$^{13}$C NMR (125 MHz, acetone-d$_6$) δ ppm 152.67 (C6×2), 136.96 (C5×2), 136.26 (C3×4), 129.09 (C2×2), 118.57 (C4×4), 78.52 (C8×2), 75.22 (C9×2) 51.73 (C7×2), 40.17 (C1).

Mass spectrometry, expected 362.38. found (M+Na)$^+$ 385.13

Elemental Analysis: Expected C, 69.60; H, 5.01; N, 7.73. Found C, 69.21; H, 4.50; N, 7.66.

Example 7

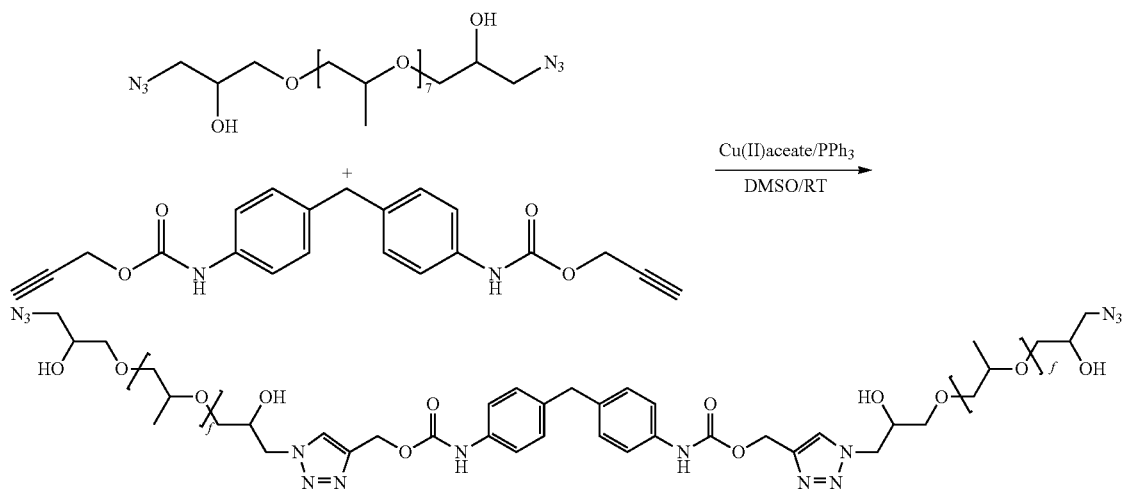

To a reaction vial containing a magnetic stirrer azide ring-opened Grilonit® F704 (471 μL, 0.80 mmol) was added along with the product of Example 6 (145 mg, 0.5 eq. 0.40 mmol) and Cu(II) acetate (9.3 mg, 0.1 eq., 0.040 mmol) and triphenyl phosphine (21.1 mg, 0.2 eq., 0.080 mmol) 5 ml of DMSO was added to the reaction vessel. The reaction vessel was left stirring at room temperature for 16 hours.

A liquid/liquid extraction into ethyl acetate provided a viscous product. In addition a small amount of sample was placed in a glass reaction vial and left in vacuum oven overnight to drive off residual DMSO solvent. The resulting product was a slightly tacky solid that remained in position as the glass vial was inverted.

Example 8

In this experiment, the use of solvents alternative to DMF or DMSO in the 1,3-dipolar cycloaddition was investigated. As alternative solvents, N-methylpyrrolidone (NMP), methoxy propyl acetate (MPA) and two naphtha-based solvents were tested. These solvents are currently used in the formulation of polyurethane-based coatings.

As a first step, the suitability of the previously mentioned solvents was investigated for the reaction between propargyl alcohol and MDI. It was found that MPA and NMP are highly suitable for solubilising the MDI starting material (Table 1), therefore the reaction between the propargyl alcohol and MDI was carried out in these two solvents only.

TABLE 1

Solubility of MDI; the product of Example 6 and the click reaction catalysts

| | Material | | | |
|---|---|---|---|---|
| Solvent | MDI | Cu(II) acetate | Triphenyl phosphine | Product of Example 6 |
| NMP | ✓ | ✓ | ✓ | ✓ |
| MPA | ✓ | ✓ | ✓ | ✓ |
| Naptha based solvent (1) | x | x | x | x |
| Naptha based solvent (2) | x | x | x | x |

The naphtha-based solvents were found to be poor solvents for the click reaction and therefore the click reaction was only carried out in NMP and MPA.

The preparation of the product of Example 6 in MPA proceeded smoothly and in high yields. The $^1$H NMR of the resulting product shows signals associated with the product of Example 6, with both a doublet and triplet at 4.72 and 3.5 ppm respectively.

The $^1$H NMR of the product of Example 6 in NMP showed the characteristic signals at 3.5 and 4.7 ppm, in addition to a large signal at 8.5 ppm. This is likely to be from the reaction of MDI with water, present in the hygroscopic NMP solvent. Consequently, NMP is less a suitable as a solvent for the preparation of the product of Example 6. Hydrolysis of MDI was in contrast not an issue with MPA as a solvent.

Example 9

The solvents NMP and MPA were further investigated as reaction mediums for the click reaction between the product of Example 6 and 2 equivalents of benzyl azide to provide the bistriazole.

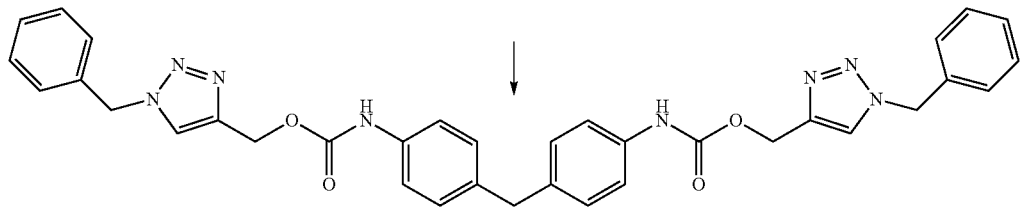 [SMILES: O=C(Nc1ccc(Cc2ccc(NC(=O)OCc3cn(Cc4ccccc4)nn3)cc2)cc1)OCc1cn(Cc2ccccc2)nn1]

The Cu(II) acetate was kept at a 10 mol % loading for both solvents. It was found that NMP performed similar to DMSO as a reaction solvent, affording full conversion of the product of Example 6 to the bistriazole within five hours. The conversion of the product of Example 6 to the bistriazole was slower in MPA with about 69% in five hours.

Example 10

Based on the promising results with MPA as reaction solvent for the preparation of the product of Example 6 and the click reaction, a "one-pot" process was attempted, where MPA was used as the solvent in both reactions. The product of Example 6 was prepared via the reaction between MDI and propargyl alcohol, in the absence of any triethylamine catalyst at 60° C. for four hours, a sample of the crude reaction mixture was then reacted with benzyl azide for one hour, in the presence of a 10 mol % loading of Cu(II) acetate to afford JC2. The $^1$H NMR of the resulting product shows the characteristic peaks for the bistriazole of Example 9 at 5.15, 5.56 and 8.2 suggesting that there has been successful preparation of the product of Example 6 and subsequently the CuAAC click reaction has proceeded smoothly to yield the bistriazole of Example 9.

The invention claimed is:
1. A substrate comprising:
a coating of a reaction product of:
an azide compound having 2 or more azide groups attached thereto; and
an alkyne compound having 2 or more alkyne groups attached thereto, wherein the azide and alkyne groups react in a 1,3 dipolar cycloaddition to form 1,4-disubstituted triazoles and wherein the azide or alkyne compound or both include —O—(C=O)—NR— groups with R=hydrogen or alkyl,
wherein the substrate is part of a roof structure.
2. The substrate of claim 1,
wherein the azide compound and/or the alkyne compound comprises:
a prepolymer having an azide group or an alkyne group attached thereto.
3. The substrate of claim 2, wherein the prepolymer is a polyurethane prepolymer.
4. The substrate of claim 1,
wherein the azide compound has a hydroxyl group on the β-carbon of the azide group.
5. The substrate of claim 1, wherein the azide compound is formed as a reaction of a nucleophilic azide with an epoxy compound and subsequent reaction with a polyisocyanate.
6. The substrate of claim 4, wherein the azide compound is formed as a reaction of a polyisocyanate or isocyanate terminated polyurethane prepolymer and an epoxy compound having a functional group reactive towards isocyanates, and subsequent reaction with a nucleophilic azide.
7. The substrate of claim 6, wherein the epoxy compound is glycidol.
8. The substrate of claim 6, wherein the polyisocyanate is MDI or a prepolymer containing terminal MDI residues.
9. The substrate of claim 6, wherein the functional group is a hydroxyl group.
10. The substrate of claim 1, wherein the alkyne compound is formed as a reaction of a polyisocyanate and an alkyne having a functional group reactive towards isocyanates.
11. The substrate of claim 10, wherein the functional group is an amine, hydroxyl or thiol group.
12. The substrate of claim 1, wherein the alkyne compound is formed as a reaction of an epoxy compound and an alkyne having a functional group reactive towards epoxides, and subsequent reaction with an alkyne group-containing alkylation agent.
13. The substrate of claim 12, wherein the alkyne group-containing alkylation agent is a propargyl halogenide.
14. The substrate of claim 12, wherein the functional group is an amine or a thiol group.
15. The substrate according to claim 1, wherein the reaction product is configured as a coating, a sealant, an adhesive or an elastomer.

* * * * *